United States Patent
Malaval

[11] Patent Number: 5,186,888
[45] Date of Patent: Feb. 16, 1993

[54] DEVICE FOR RECOVERING AND COOLING THE CORE OF A NUCLEAR REACTOR IN MELTDOWN FOLLOWING

[75] Inventor: Claude Malaval, Antony, France
[73] Assignee: Framatome, Courbevoie, France
[21] Appl. No.: 884,181
[22] Filed: May 18, 1992
[30] Foreign Application Priority Data
May 17, 1991 [FR] France .................. 91 06047
[51] Int. Cl.$^5$ ............................. G21C 9/016
[52] U.S. Cl. ................ 376/280; 976/DIG. 143
[58] Field of Search ............ 376/280; 976/DIG. 143
[56] References Cited

U.S. PATENT DOCUMENTS

| | | | |
|---|---|---|---|
| H91 | 7/1986 | Gabor et al. | 376/280 |
| 3,607,630 | 9/1971 | West et al. | 376/280 |
| 4,116,764 | 9/1978 | Jones | 376/280 |
| 4,280,872 | 7/1981 | Ferrari et al. | 376/280 |
| 5,057,271 | 10/1991 | Turricchia | 376/280 |

FOREIGN PATENT DOCUMENTS 0392604 10/1990 European Pat. Off. .
1608027 10/1970 Fed. Rep. of Germany .
2000357 1/1979 United Kingdom .

*Primary Examiner*—Daniel D. Wasil
*Attorney, Agent, or Firm*—Pollock, Vande Sande & Priddy

[57] ABSTRACT

The device is constituted by a metal structure (10) resting on the bottom of the reactor pit (3) and submerged in a mass of water filling the lower portion of the reactor pit (3). The metal structure (10) comprises a central chimney (11), a recovery wall (12) constituted by juxtaposed dihedra (22) made from metal sheet, and a peripheral wall (13) fixed to the external edges of the dihedra (22) and providing water passages at the periphery of the reactor pit. When the molten core of the reactor spreads into the reactor pit, following an accident, the structure (10) ensures its recovery and prevents contact between the molten core and the bottom of the reactor pit. The molten core flows onto the wall (12) in such a manner as to constitute a layer of small thickness which is cooled over its upper surface and over its lower surface and which solidifies rapidly.

6 Claims, 3 Drawing Sheets

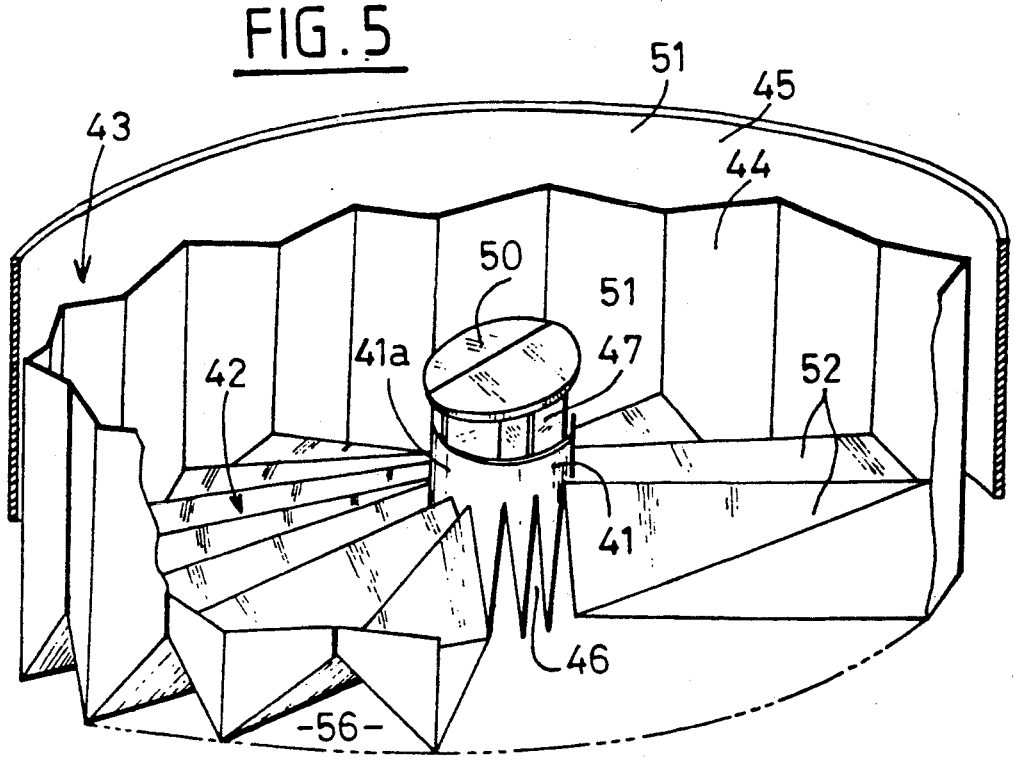
FIG. 5
FIG. 5A
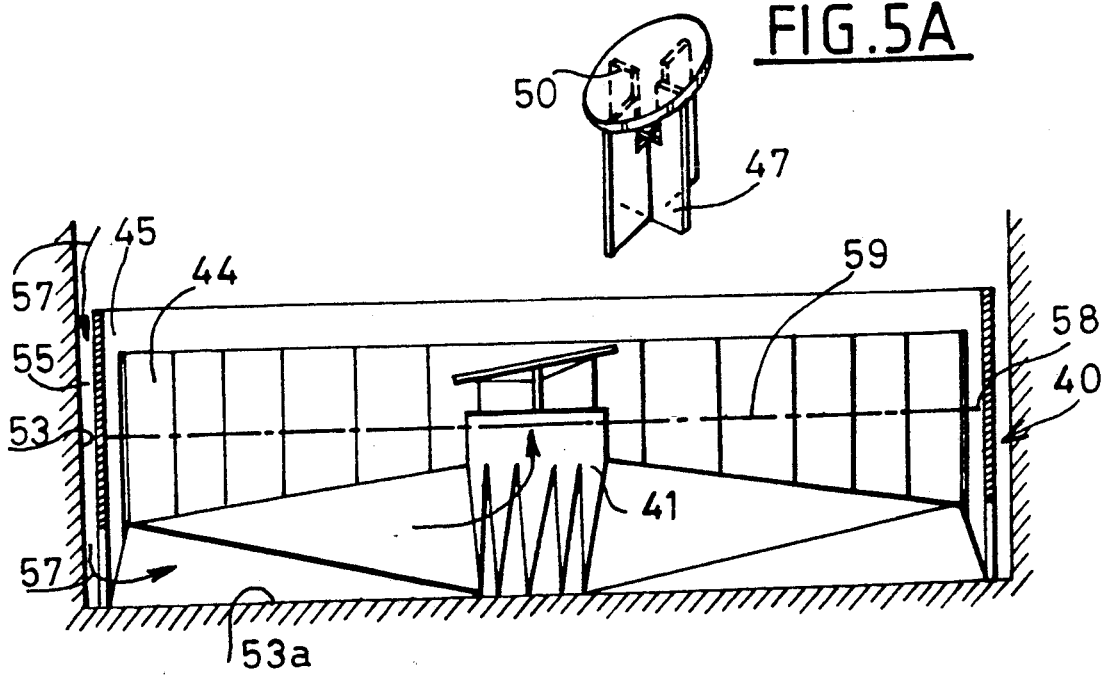
FIG. 6

DEVICE FOR RECOVERING AND COOLING THE CORE OF A NUCLEAR REACTOR IN MELTDOWN FOLLOWING

FIELD OF THE INVENTION

The invention relates to a device for recovering and cooling the core of a nuclear reactor in meltdown following an accident.

BACKGROUND OF THE INVENTION

Pressurized-water nuclear reactors comprise a vessel of generally cylindrical shape enclosing the reactor core, which vessel is disposed with its axis vertical in a cylindrical reactor pit having a lower bottom located vertically below the vessel. The nuclear reactor core is cooled by pressurized water circulating in the primary coolant circuit of the reactor and inside the vessel in contact with the fuel assemblies.

In the event of certain accidents arising in the nuclear reactor and resulting in a loss in the cooling function of the core, it is possible, though highly improbable, that serious consequences may ensue if the emergency injection circuits of the reactor cannot be put into operation. It is then possible for an accidental sequence to occur which leads to meltdown of the core in the absence of cooling water, which may involve destruction by piercing of the bottom of the vessel and flow of the mass of the molten core and of the materials surrounding the core into the concrete pit containing the reactor vessel. The contact of the molten mass of the fuel and the materials surrounding the fuel, called corium, the temperature of which may reach 2800° to 3000° C., with the bottom of the concrete reactor pit, in the absence of cooling, may lead to the complete destruction of the bottom of the pit. The corium may then force its way into the raft of the reactor containment shell, destroy this raft and contaminate the water table present in the ground of the nuclear-reactor site. The advance of the corium within the ground may only be stopped when the residual power of the corium has decreased sufficiently.

Various devices have been proposed for avoiding contact between the corium and the bottom of the concrete reactor pit.

The known devices generally enable the mass of corium to be spread out over a certain surface in order that the power to be removed per unit of surface is as low as possible and is compatible with the possibility of cooling by fluids. It has been proposed, for example, to recover and to contain the corium in a metal bag clad internally with refractory materials whose partial melting absorbs the energy, transiently, and provides a sufficient interval of time to externally immerse the metal bag in a mass of water, so as to remove the residual power of the corium by boiling of the mass of water.

The drawback of this device stems from the fact that the refractory materials are most often very poor heat conductors, which has the effect of increasing the equilibrium temperature of the corium which remains in the liquid state.

Other devices are known which use refractory hearths continuously cooled by a water circuit. One of the drawbacks of these devices is that the cooling circuit may have failures which are liable to render it at least partially ineffective. Furthermore, the heat exchange is not sufficiently great to prevent the corium from remaining at a high temperature and in the liquid state after its discharge onto the recovery and cooling device.

A device is also known which is constituted by a stack of sectional profiles placed horizontally in the bottom of the pit, beneath the bottom of the vessel, in such a manner as to constitute receptacles for the molten corium, so as to disperse the molten mass, to promote its cooling and to enable it to solidify. However, this device has the drawback of not effectively protecting the concrete of the reactor pit when the flow of the corium occurs in a localized manner. The sectional profiles which are disposed in a staggered fashion are then liable to be successively filled with molten corium by local overflow, such that the molten mass may rapidly reach the bottom of the reactor pit.

SUMMARY OF THE INVENTION

The object of the invention is therefore to propose a device for recovering and cooling the core of a nuclear reactor in meltdown following an accident, the reactor comprising a cylindrical vessel enclosing the reactor core, which vessel is disposed with its axis vertical in a cylindrical reactor pit having a lower bottom located vertically below the vessel, and the recovery device being constituted by a metal structure resting on the bottom of the reactor pit and submerged in a mass of water filling the lower portion of the reactor pit, this device enabling any contact between the mass of the molten core and the concrete of the reactor pit to be prevented and the molten mass to be cooled and solidified rapidly.

With this object in mind, the metal structure comprises:
- a central chimney comprising a cylindrical body disposed coaxially in relation to the reactor pit and a deflecting upper wall inclined in relation to the horizontal plane and disposed above the cylindrical body,
- a wall for recovering and cooling the core, which wall is disposed around the body of the chimney and constituted by an assembly of contiguous dihedral elements consisting of metal sheets and having a straight ridge, which elements are fixed radially around the body of the chimney, by inner end portions, in the region of triangular openings traversing the wall of the body of the chimney, the ridges of the dihedra constituting their upper portion being inclined upwards in the direction of the chimney and the space located between the recovery wall and the bottom of the pit communicating with the chimney via the triangular openings,
- a peripheral wall disposed in the vicinity of the internal surface of the reactor pit and formed by vertical dihedra, in such a manner as to provide at least one passage bringing the space located between the recovery wall and the vessel bottom into communication with the internal volume of the reactor pit, above the recovery wall.

BRIEF DESCRIPTION OF THE DRAWINGS

To provide a better understanding of the invention, there will now be described, by way of example and with reference to the attached drawings, several embodiments of a device for recovering and cooling the molten mass of the core of a pressurized-water nuclear reactor.

FIG. 5 is a perspective view of a second embodiment of a recovery and cooling device according to the invention.

FIG. 5A is a detail view, in perspective, of the chimney of the device shown in FIG. 5.

FIG. 6 is a view, in vertical cross-section, of the device shown in FIG. 5.

DESCRIPTION OF PREFERRED EMBODIMENT

Figure 1:
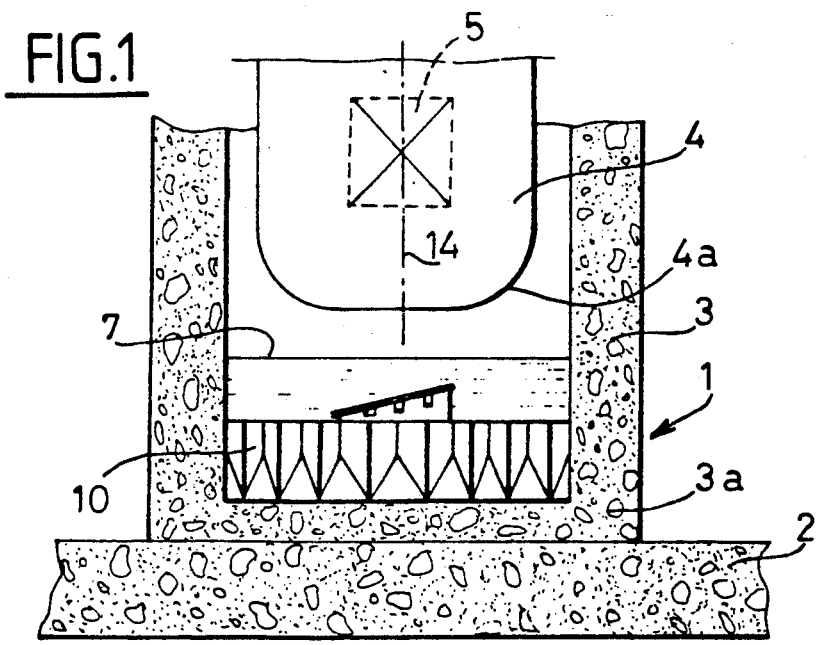
FIG. 1 is a schematic view, in elevation and in cross-section, of the lower portion of a reactor pit of a pressurized-water nuclear reactor equipped with a recovery and cooling device according to the invention.

FIG. 1 shows a portion of the concrete structure 1 of a nuclear reactor comprising the raft 2 of the containment shell of the reactor, constituted by a slab of great thickness, and the reactor pit resting on the raft 2 by means of its lower bottom 3a.

The generally cylindrical vessel 4 of the nuclear reactor enclosing the core 5 is closed at its lower portion by a curved bottom 4a and disposed within the reactor pit 3 with its vertical axis coincident with the axis of the reactor pit.

The lower portion of the reactor pit 3, above the bottom 3a, is filled with water up to a level 7.

A recovery and cooling device 10 according to the invention, constituted by a metal structure, rests on the pit bottom 3a, beneath the vessel bottom 4a, in such a manner as to recover and cool the corium constituted by the molten mass of the core 5, in the case of an accident which results in a total loss in cooling of the nuclear reactor.

The metal structure constituting the device 10 is entirely submerged in the mass of water filling the lower portion of the reactor pit 3, up to the level 7.

Figure 2:
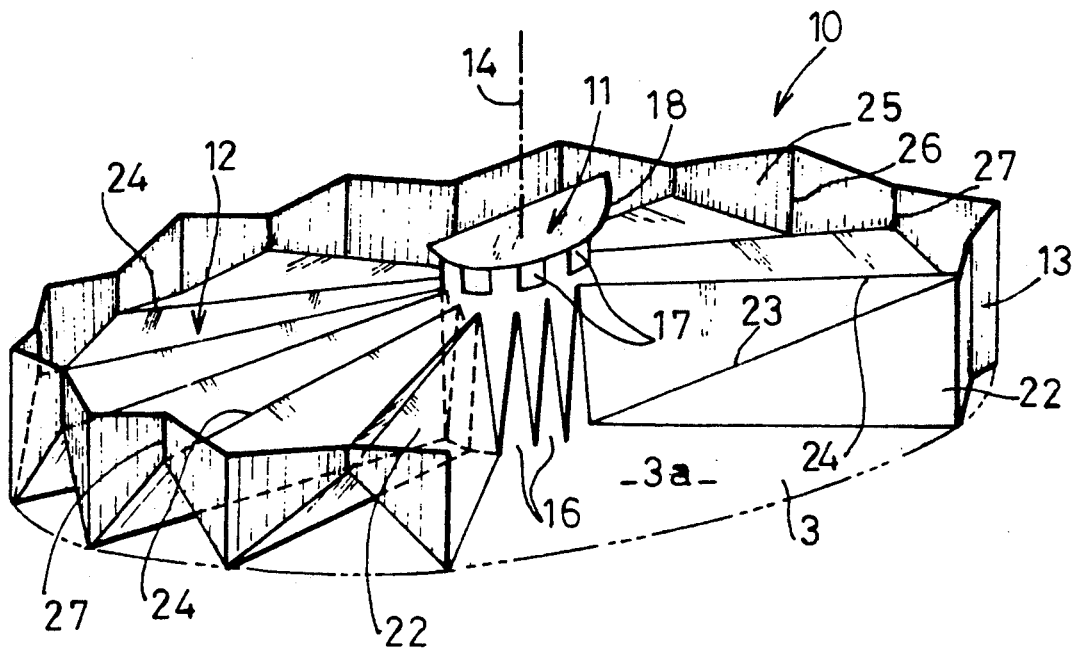
FIG. 2 is a perspective view of one embodiment of a recovery and cooling device according to the invention.

FIG. 2 shows the recovery and cooling device 10 resting on the pit bottom 3a in the lower portion of the reactor pit 3 whose inner surface has been shown schematically in broken lines.

Figure 3:
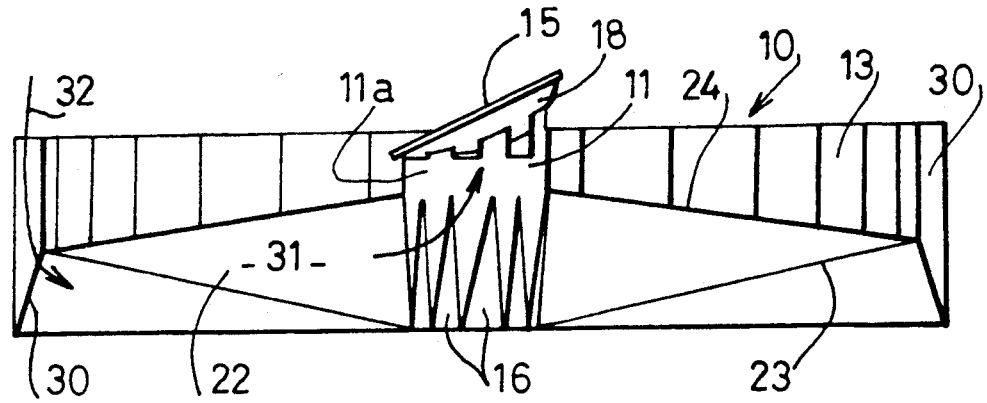
FIG. 3 is a view, in vertical cross-section, of the device shown in FIG. 2.

As shown in FIGS. 2 and 3, the device 10 is constituted by a metal structure comprising a central chimney 11, a recovery and cooling wall 12 surrounding the chimney 11 and a peripheral wall 13 whose transverse cross-section, perpendicular to the axis 14 of the chimney 11, coincident with the axis of the reactor pit 3, has a polygonal shape.

The chimney 11 comprises a cylindrical tubular body 11a and a deflecting upper wall 15 fixed above the upper end of the tubular body 11a and inclined to the horizontal plane.

The wall of the tubular body 11a and the deflecting wall 15 are made entirely of metal, and generally of steel.

The wall of the tubular body 11a is traversed by triangular openings 16 extending over a substantial portion of its height. The base of the triangular openings 16 are located in the region of the lower portion and their apexes in the vicinity of the upper portion of the tubular body 11a.

In the case of the embodiment shown in FIGS. 2 and 3, thirteen successive openings 16 are provided along the periphery of the cylindrical body of the chimney 11.

The upper portion of the tubular body 11a is also cut out in order to constitute gaps 17 located above the triangular openings 16 and emerging at the upper end of the tubular body.

The deflecting wall 15 is fixed to the ends of the gaps 17. The upper portion of the tubular body 11a of the chimney has a cutout of the ends of the gaps 17, such that the deflecting wall 15 is fixed in a position inclined to the horizontal plane.

The recovery and cooling wall 12 is constituted by dihedral elements 22 fixed to each other contiguous along their lateral edges.

Some of the dihedra 22 of the wall 12 have been omitted, so as better to reveal the structure of the device. However, it will be understood that the wall 12 is continuous all around the chimney 11.

Each of the dihedra 22 of the wall 12 is constituted by rectangular metal sheets folded and assembled together by welding, for example along the straight ridge 24.

Each of the dihedra 22 is fixed at its inner end to the body 11a of the chimney 11 along the inclined edges of a triangular opening 16. The lateral edges of the dihedral elements 22 which are assembled together are placed in a horizontal disposition and rest on the bottom 3a of the reactor pit.

The inclined faces of the roof-shaped elements 22 have a rectangular shape and are folded outwards along a diagonal 23, such that the dihedra have two different angles of opening, a small first angle of opening in the region of the opening 16 of the chimney and a second angle of opening, greater than the first, in the dihedron portion directed outwards, i.e., towards the wall of the reactor pit. Thus, the dihedral elements 22 only comprise plane faces. In addition, the ridge 24 of the dihedron constituting the upper portion of each of the elements 22 is inclined upwards in the direction of the chimney 11, i.e., from the outside towards the inside of the recovery device 10.

The dihedral elements 22 are disposed radially around the chimney 11.

The peripheral wall 13 is constituted by a succession of dihedra 25 having trapezoidal faces and substantially vertical ridges 26, 27 for joining or for folding. The dihedra 25 are fixed along the two inclined edges of the outer end having a large angle of opening of each of the horizontal dihedral elements 22 having a triangular cross-section.

The wall 13 has the shape of a ring fixed along the entire periphery of the recovery wall 12, along the outer inclined edges of this wall 12 which consists of contiguous dihedra.

The peripheral wall 13 is disposed above the recovery wall 12, such that this peripheral wall constitutes the raised outer edge of a receptacle for recovering the molten mass of the core of the nuclear reactor, the wall 12 of which constitutes the bottom.

The metal structure constituting the recovery device 10 may be produced by welding starting from metal sheets whose composition and thickness are determined by the conditions of use of the device.

The device in its entirety is placed within the reactor pit of a pressurized-water nuclear reactor and rests on the pit bottom 3a, by means of the lower portion of the recovery wall 12 constituted by the lateral edges of the dihedral elements 22 and by the base of the body 11a of the chimney 11.

The size of the structure constituting the device 10 is such that this structure may be exactly centred within the reactor pit, the ridges 26 of the peripheral wall 13 coming into contact with the internal surface of the reactor pit and the axis of the chimney 14 being coincident with the axis of the reactor pit.

During operation of the reactor, the structure 10 is entirely submerged in a mass of water filling the bottom of the reactor pit.

During an accident to the nuclear reactor which results in a total loss in the cooling function of the core and therefore in a heating of the mass of the core which can no longer be controlled, the emergency injection devices having become inoperable, the mass of the core is liable to reach a temperature at which it constitutes a molten mass which flows into and pierces the bottom of the vessel. The mass of the molten core or corium then flows into the bottom of the reactor pit where it comes into contact with the mass of water filling the lower portion of the reactor pit and with the recovery and cooling device according to the invention.

In the case of a piercing substantially centered in relation to the vessel bottom, which is most often the case, the mass of corium comes into contact with the device 10, in the region of the deflecting surface 15 which directs the flow of the molten mass towards the recovery and cooling wall 12.

The upper surface of this wall, which is constituted by successive dihedra whose faces have steep slopes, enables the corium to be spread out very rapidly in circumferential directions and in the direction of the periphery of the recovery and cooling device.

The corium is therefore spread out very rapidly in the form of a relatively thin layer which is cooled over its upper face by the water filling the reactor pit and over its lower face by the cooling wall 12 which delimits, together with the bottom 3a of the reactor pit, a space filled with water cooling the wall 12, the heat being taken up by the heating and specially the vaporization of this water. In addition, a powerful circulation of water and of steam in contact with the wall 12 is produced, because the water contained in the space located between the wall 12 and the pit bottom 3a, within the channels having a triangular cross-section delimited by the dihedra 22, is in thermal contact with the corium, by means of the wall 12, and is vaporized within the channels. The steam formed is driven very rapidly towards the chimney 11, in particular as a result of the inclination of the upper ridge 24 of the dihedra 22. The steam penetrating into the tubular body 11a of the chimney 11 is removed via the openings 17.

The peripheral wall 13 which is fixed to the inclined edges of the recovery wall 12 delimits water passages 30 between its outer surface and the internal surface of the reactor pit 3. The water passages 30 bring the portion of the reactor pit located above the recovery wall 12 into communication with the water passages 31 having a triangular cross-section located between the dihedra of the wall 12 and the pit bottom 3a.

In this manner, the water filling the bottom of the reactor pit 3 can circulate, as indicated by the arrow 32 in FIG. 3, between the internal space of the reactor pit 3 located above, the device 10 and the channels 31 in which is produced the vaporization of the water in thermal contact with the corium which is recovered by the surface 12 and which is spread out over the inclined surfaces of this surface 12. The water transformed into steam within the channels 31 and removed by the chimney 11 is therefore replaced by water coming from the space of the reactor pit located above the device 10. A powerful circulation of water in contact with the internal surface of the channels 31 is therefore produced.

The corium is therefore simultaneously cooled from above, by the mass of water filling the reactor pit 3, and from below, by the water circulating within the channels 31, which water is heated and vaporized by the corium.

Figures 4A, 4B:
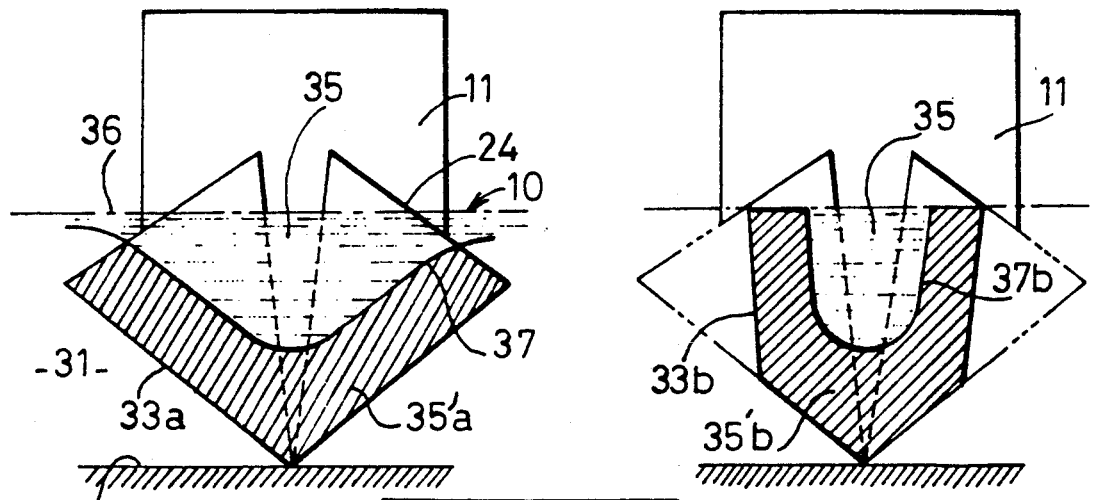
FIGS. 4A, 4B and 4C are views, in cross-section along A, B and C, respectively, in FIG. 3, of the recovery and cooling device shown in FIG. 3.
Figure 4C:
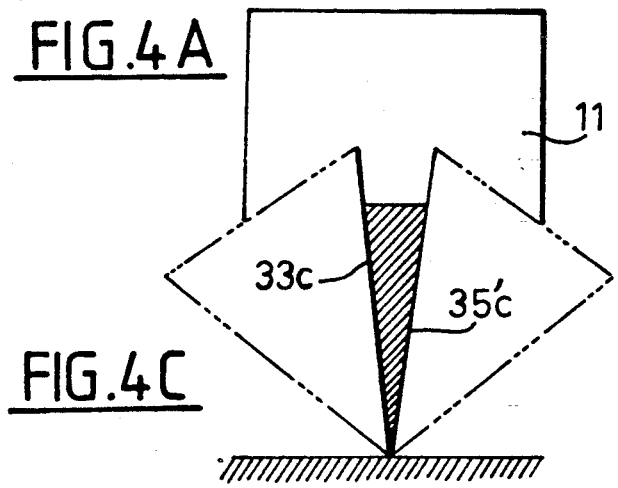

FIGS. 4A, 4B and 4C show a portion of the recovery and cooling device 10 comprising the steam-removal chimney 11 and the recovery wall 12 constituted by juxtaposed dihedra and delimiting the channels 31 having a triangular cross-section.

Three cross-sections 33a, 33b and 33c of the wall 12, corresponding to the cutting planes A, B and C, respectively, shown in FIG. 3, have also been shown in FIGS. 4A, 4B and 4C.

The cross-section 33a corresponds to the external edge of the wall 12 comprising the inlet portions of the channels 31.

The cross-section 33c corresponds to the internal edge of the separating wall 12 joined to the chimney 11 along the edges of the openings 16.

The cross-section 33b corresponds to an intermediate cross-section in which the faces of the dihedra have two different successive slopes.

Also shown in FIGS. 4A, 4B and 4C is a mass of corium 35 which is discharged onto the recovery wall 12 in the event of an accident and which is spread out in contact with the upper surface of the surface 12.

The shape of the corium layer which solidifies very rapidly after being discharged, in contact with the upper surface of the wall 12, has been shown in the various cross-sections 33a, 33b and 33c.

In the cross-section 33a, the upper portion of the mass of solidified corium 35'a is delimited by a curved surface 37a substantially parallel to the saw-toothed surface of the surface 12. Powerful and substantially uniform cooling of the mass of corium is produced in the cross-section 33a, such that a thick layer 35'a of solidified corium is formed very rapidly on the upper surface of the wall 12.

The upper level 37b of the mass of solidified corium in the intermediate cross-section 33b has also been shown. This surface 37b comprises two edges substantially parallel to the steeply sloping portion of the cross-section 33b and a curved central portion. The corium spreading over the wall 12 is cooled powerfully, and very rapidly constitutes a thick layer in the upper portion of the teeth of the wall 12. The corium reaching the roots of the dentation, between two angularly disposed successive portions of the wall 12, is strongly cooled between the two surfaces in the dihedral angle which these surfaces delimit, so as to constitute a mass of solidified corium 35'b filling, in particular, the entire internal volume of the dihedral angle.

Finally, in the cross-section 33c, the corium is simultaneously cooled by the upper surfaces of the wall 12 and by the wall of the chimney 11. The corium very rapidly constitutes a solidified mass 35'c filling the entire space located between two successive dentations of the wall 12.

The corium spread over the recovery wall 12 is therefore capable of very rapidly constituting a thick solidified layer over the upper surface of this wall.

Thus, advance of the liquid corium in the direction of the reactor pit 3a is prevented; the recovery wall is furthermore consolidated and stiffened by the layer of solid corium.

Even if the wall 12, which is constituted by a single metal sheet, is pierced at certain locations, by melting of the metal through the effect of the heat of the corium, the wall is immediately reconstituted by solidification of the corium which constitutes a protection layer of great thickness.

Furthermore, the cooling from below of the solidified layer of corium remains powerful, because the metal sheets and the mass of solidified corium are materials having high thermal conductivity.

It is quite clear that the recovery and cooling device 10 is intended to serve only once for the recovery of the reactor core, in the event of an accident.

FIGS. 5, 5A and 6 show a second embodiment of the device according to the invention.

The device 40 shown in FIGS. 5 and 6 comprises a central chimney 41, a recovery wall 42 constituted by juxtaposed dihedra and an external peripheral wall 43 fixed to the external ends of the dihedra constituting the wall 44.

The chimney 41 comprises a cylindrical body 41a pierced by elongate triangular openings 46 along the edges to which the internal ends of the dihedra 52 constituting the recovery wall 42 are to be joined and fixed.

As may be seen in FIGS. 5 and 5A, an element 47 constituted by plane sheets of metal which are assembled at right angles in such a manner as to have a cruciform transverse cross section is disposed and fixed to the inside of the cylindrical body 41a of the chimney 41, in its axial direction, and constitutes the support for a plane wall 50 fixed in an inclined position on the cross so formed.

In contrast to the embodiment shown in FIGS. 1 and 2, the chimney 41 does not comprise an opening in its upper portion, the steam recovered by the chimney escaping freely via the space existing between the cross 47 supporting the wall 50 and the upper portion of the cylindrical body 41a of the chimney, because the central portion 47 of the chimney is longer than the body 41a.

Furthermore, the outer peripheral wall 43 of the device 40 is no longer constituted in the form of a single wall of polygonal cross-section, as in the case of the device shown in FIGS. 2 and 3, but by a double wall comprising an inner first wall element 44 substantially identical to the wall 13 of polygonal cross-section of the device 10 shown in FIGS. 2 and 3 and a second wall element 45 constituted by a cylindrical hoop fixed coaxially to the periphery of the device 40 along the vertical ridges of the wall 44.

As may be seen in particular in FIG. 6, the hoop 45 has a diameter less than the internal diameter of the reactor pit 53, such that an annular space 55 is left enabling cooling water to circulate in the direction of the arrows 57, towards the channels 56 having a triangular cross-section and delimited by the lower surface of the recovery wall 42 and by the surface 53a of the bottom of the reactor pit 53.

As before, a powerful circulation of water is therefore produced between the space of the reactor pit located above the device 40 and the chimney 41 via the space 55 and the channels 56. Water is vaporized within the channels 56 in contact with the wall 44, the steam bubbles being removed both via the chimney 41 and into the spaces 58 located between the dihedra of the wall 44 and the internal surface of the hoop 45.

In this embodiment, the circulation of water in the space 55 is totally separated by the hoop 45 from the circulation of the steam bubbles in the spaces 58.

The operation of the device 40 in the event of discharge of corium up to the level 59 within the peripheral wall 44 is similar to the operation of the device 10 which has been described previously, apart from the fact that vaporization of water and driving of steam is produced on the outside of the peripheral wall 44 and within the hoop 45.

In the case of the device 40, the corium is recovered and spreads out efficiently over the recovery wall 42, within the peripheral wall 44, and solidifies in contact with the wall 42, such that any contact between the liquid corium and the wall of the reactor pit 53 is prevented.

In the case of a reactor pit having a transverse cross-section of a surface area of 33 $m^2$, it has been possible to produce a recovery and cooling device whose recovery surface consisting of juxtaposed dihedra has a total surface area greater than 80 $m^2$.

This device permits the recovery of a volume of corium of the order of 20 $m^3$ in the form of a layer having a height of approximately one meter above the bottom of the reactor pit.

By using a peripheral wall and a chimney of sufficient height, it is possible to recover corium having a much greater volume, for example, of the order of 40 $m^3$.

The device according to the invention therefore enables the corium escaping from the vessel of a nuclear reactor to be recovered and cooled, in the event of an accident, in such a manner as to avoid any contact between the liquid corium and the bottom of the reactor pit.

The central chimney and a peripheral wall may have a shape different from those which have been described. The peripheral wall must however be joined to the outer edge of the recovery wall constituted by juxtaposed dihedra and constituting radiating channels of triangular cross-section.

The device according to the invention may be used for recovering and cooling the corium of any nuclear reactor comprising a vessel disposed within a concrete reactor pit, in the event of an accidental situation which results in a total inoperability of the principal and auxiliary cooling systems of the nuclear reactor.

I claim:

1. Device for recovering and cooling the core (5) of a nuclear reactor in meltdown, following an accident, said reactor comprising a generally cylindrical vessel (4) enclosing said core (5), said vessel being disposed with its axis vertical in a cylindrical reactor pit (3) having a lower bottom (3a) located vertically below said vessel (4), and said device being constituted by a metal structure (10) resting on said lower bottom (3a) and being submerged in a mass of water filling a lower portion of said reactor pit (3), said metal structure (10) comprising
   (a) a central chimney (11) comprising a cylindrical body (11a) disposed coaxially with said reactor pit (3) and a deflecting upper wall (15) inclined in relation to the horizontal plane, disposed above said cylindrical body (11a);
   (b) a wall (12, 42) for recovering and cooling said core, said wall being disposed around said body of said chimney (11) and being constituted by a first assembly of contiguous dihedral elements (22, 52) consisting of metal sheets and having a straight ridge (24), said elements being fixed radially around said body of said chimney (11) by inner end portions, in a region of triangular openings (16, 46) traversing said wall of said body of said chimney (11), said ridges (24) of said dihedra constituting upper portions of said dihedra and being inclined upwards in the direction of said chimney (11) and a space located between said wall (12, 42) and said bottom of said reactor pit (3) communicating with said chimney (11) via said triangular openings (16, 46); and (c) a peripheral wall (13, 43) fixed to external ends of said dihedra (22) of said first assembly, said external ends being opposite the ends fixed to said chimney (11), and said peripheral wall being disposed in the vicinity of an internal surface of said reactor pit (3), in such a manner as to provide at least one passage (30, 55) bringing the space located between said recovery wall (12) and said bottom (3a) of said reactor pit (3) into communication with the internal volume of said reactor pit (3), above said recovery wall (12).

2. Device according to claim 1, wherein said peripheral wall (13, 43) comprises a wall element (13, 44) of polygonal cross-section constituted by a second assembly of dihedral elements fixed to the external ends of said dihedra (22) of said first assembly and comprising straight ridges (26, 27) disposed vertically on the periphery of said reactor pit (3).

3. Device according to claim 2, wherein said peripheral wall further comprises a cylindrical hoop (45) fixed coaxially with said peripheral wall (44) along external vertical ridges of said peripheral wall, said hoop (45) having a diameter less than a diameter of said reactor pit, so as to provide on the periphery of said recovery and cooling device (40) an annular space (55) bringing the space located between said recovery wall (42) and said bottom (53a) of said reactor pit into communication with the internal volume of said reactor pit (53), above said recovery wall (42).

4. Device according to any one of claims 1 to 3, wherein said cylindrical body (11a) of said central chimney (11) has an upper portion comprising gaps (17) for passage of steam.

5. Device according to any one of claims 1 to 3, wherein said chimney (41) further comprises a cross-shaped central element (47), to which is fixed said deflecting upper wall (50), having a height in an axial direction greater than a height of said cylindrical body of said chimney (41).

6. Device according to any one of claims 1 to 3, wherein said dihedra (22) of said first assembly comprise rectangular inclined faces folded along a diagonal (23) in such a manner that the dihedra (22) have two different angles of opening in the radial direction.

* * * * *

UNITED STATES PATENT AND TRADEMARK OFFICE
CERTIFICATE OF CORRECTION

PATENT NO. : 5,186,888
DATED     : February 16, 1993
INVENTOR(S) : Claude Malaval It is certified that error appears in the above-identified patent and that said Letters Patent is hereby corrected as shown below:

On the title page, Item [54] Title of the Invention
At the end of the title add:   --AN ACCIDENT--.

Signed and Sealed this

Eighth Day of March, 1994

Attest:

BRUCE LEHMAN

*Attesting Officer*     *Commissioner of Patents and Trademarks*